Patented Nov. 24, 1931

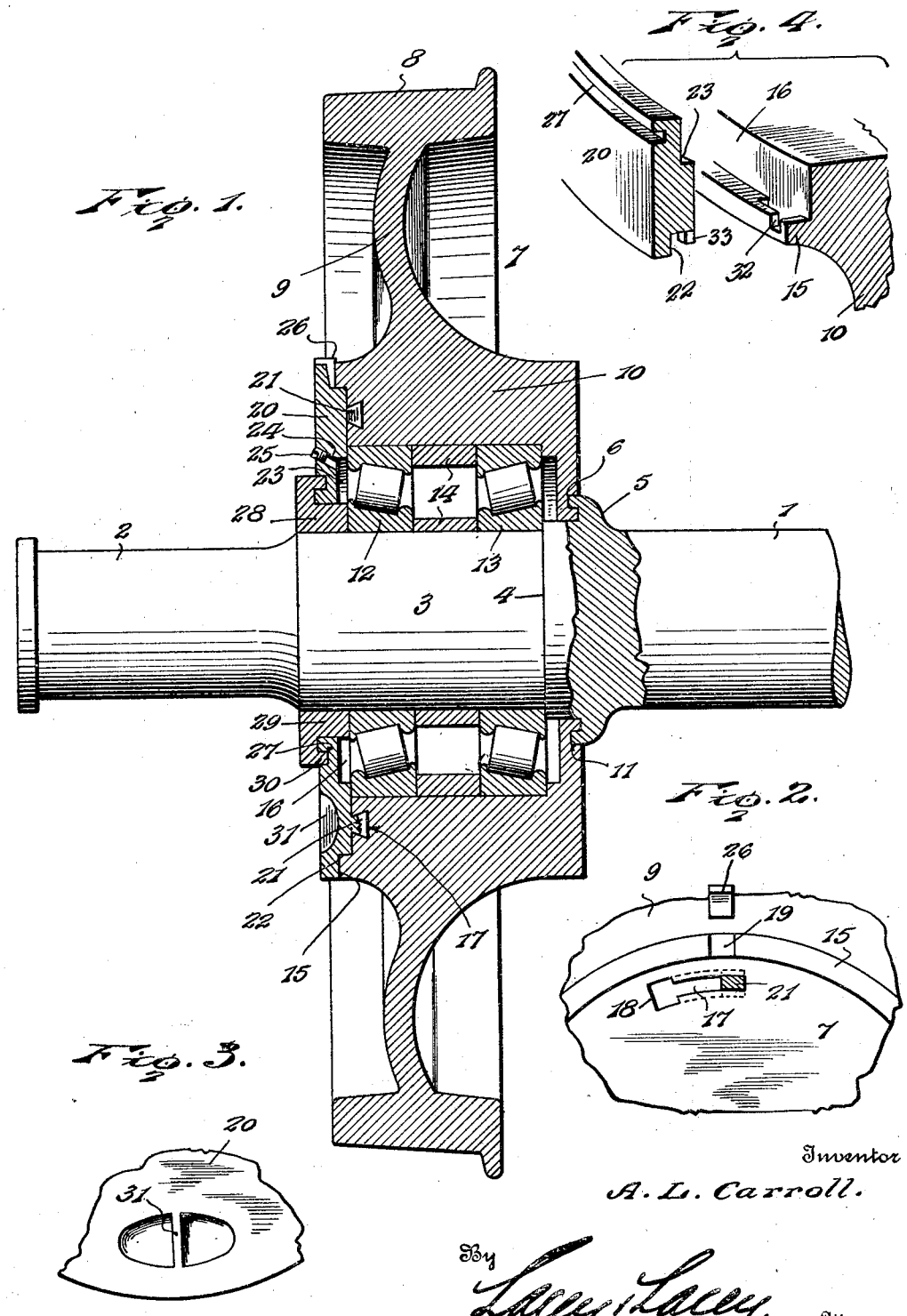

1,833,407

UNITED STATES PATENT OFFICE

ANDREW L. CARROLL, OF ST. LOUIS, MISSOURI, ASSIGNOR OF ONE-THIRD TO CHARLES L. PALMER, OF ST. LOUIS, MISSOURI

CAR WHEEL

Application filed December 15, 1930. Serial No. 502,516.

This invention relates to anti-friction car wheels and has for its object the provision of means whereby the car wheel will be firmly held upon an axle and rotate about the axle, while the axle will be permitted to creep relative to the car wheel so that the wheel will run freely at all times. Another object of the invention is to provide novel means for closing the car wheel bearing against the entrance of dust and other foreign matter and to retain in the bearing the lubricant supplied thereto. The invention is illustrated in the accompanying drawings and will be hereinafter fully described, the novel features being particularly defined in the appended claims.

In the drawings:

Figure 1 is a vertical section of a car wheel embodying the present invention, the axle being shown partly in section and partly in elevation.

Fig. 2 is a detail view in elevation of a portion of the wheel showing the construction whereby the cover plate is held in position, Fig. 3 is a detail elevation of a portion of the cover plate, and Fig. 4 is a detail showing a slight modification.

In the drawings, the reference numeral 1 indicates the car axle having its outer extremity formed into a journal, as shown at 2, to be mounted within a journal box in the usual manner. Immediately adjacent the journal portion 2, the axle is formed with a portion 3 of slightly greater diameter than the journal portion, and this portion 3 receives the bearing for the car wheel. The bearing portion 3 has a smooth exterior entirely free of threads, as clearly shown in Fig. 1, and terminates at an annular shoulder 4 defined by the inner main body of the axle, an annular rib 5 being formed on the axle at the inner side of the shoulder 4 and having an annular flange or rib 6 on its radial face projecting outwardly, as clearly shown in Fig. 1. The car wheel 7 is of the same general form as car wheels now in use, having a tread 8 to run upon the track rails and a web 9 connecting said tread with a hub portion 10. The inner side or end of the hub portion is smooth and fits closely about the axle 1 at the inner side of the shoulder 4 and is provided with an annular groove 11 which receives the flange 6 so that the wheel will be maintained in concentric relation to the axle, and inward movement of the wheel along the axle will be prevented. Fitted within the hollow central chamber of the hub and about the bearing portion 3 of the axle are roller bearings, which may be of any approved type, the bearings being shown at 12 and 13, and spacing rings 14 being fitted in place between the race rings of the bearings whereby the bearings will be held in proper spaced relation. The outer face of the wheel is formed with a flange 15 encircling a recess or chamber 16 which merges into the outer end of the chamber containing the anti-friction bearings. Spaced around the bearing chamber and in the base of the recess or chamber 16 are grooves 17 of dovetail formation, shown most clearly in Fig. 1, and provided at one end with an enlarged entrance opening 18, as shown in Fig. 2. A radial groove 19 is also formed through the shoulder or flange 15, for a purpose which will presently appear. Fitted to the outer face of the wheel is a cover plate 20 which is provided at its inner side with tenons 21 of dovetail formation, whereby they may pass through the entrance openings 18 of the respective slots or grooves 17 and then be moved laterally a short distance to engage in said slots and grooves and form a dovetail connection with the hub of the wheel. The plate 20 is recessed at its periphery, as indicated at 22, whereby it will fit closely to and over the annular flange 15 and will extend over the outer open end of the bearing chamber of the wheel, thereby excluding dust and serving to retain the lubricant in the bearing chamber. The cover plate may be formed with a shallow chamber or recess 23 in its inner face to facilitate the access of lubricant to the bearings, and at any convenient point an opening 24 may be formed through the plate to lead into said recess 23 for the admission of lubricant, the outer end of the opening being normally closed by a plug 25 in an obvious manner.

This opening 24 may be of any desired dimension and will facilitate the application of a grease gun to force lubricant into the bearings. The tenons 21 engaged in the grooves or slots 17, will effectually prevent the cover plate falling from the wheel, and to prevent the cover plate rotating relative to the wheel and thereby possibly disengaging the tenons from the slots, a recess is formed in the periphery of the cover plate at such point as will permit it to register with the groove 19 in the wheel, and a locking key or wedge 26 is engaged in said registering grooves whereby to prevent the relative rotation of the cover plate. The cover plate 20 is provided with a central opening whereby it may be fitted over the axle, and also has an annular groove, indicated at 27, in its outer face adjacent the central opening and concentric therewith. A retaining nut or collar 28 is mounted upon the outer end of the bearing portion 3 of the axle and has a central hub member 29 adapted to extend through the central opening of the plate 20 and abut the inner race ring of the outer bearing. On its inner side at its margin, the nut or collar 28 is formed with an annular flange 30 which seats in the groove 27 of the plate 20 so that a close joint is formed with the plate and leakage of lubricant is prevented. The nut or collar 28 has an inner diameter, such that it will fit closely upon the bearing portion of the axle, and it is spun or pressed onto the axle so that when it is fitted in place, it will very effectually remain set and will prevent releasing movement of the plate 20 and the wheel.

To facilitate the application of the plate 20, it will preferably be provided at its outer face with a recess and thumb hold, indicated at 31, whereby it may be easily grasped and the necessary partial rotation imparted to turn the tenons 21 home in the several slots 17.

The cover plate may be so proportioned that it may be pressed into place on the wheel and the frictional engagement be found sufficient to hold it firmly in place, but some positive fastening will probably be preferred. Instead of the fastening shown in Fig. 2, that shown in Fig. 4 may be used, the rib 15 having a bayonet slot or groove 32 formed therein and the cover plate being provided with a lug 33 to engage in said slot or groove in an obvious manner.

It will be readily seen, from the foregoing description, taken in connection with the accompanying drawings, that I have provided a very simple and efficient car wheel, entirely free of bolts, which may be rotated freely at high speed with minimum friction, and the construction is such that some creeping of the axle will be permitted, thereby adding to the rolling qualities of the device.

Having thus described the invention, I claim:

1. The combination with an axle, and a car wheel mounted thereon, of anti-friction bearings interposed between the axle and the wheel, a cover plate disposed against the outer face of the wheel and extending over the outer ends of the bearings, a smooth-bored nut mounted tightly upon the axle at the outer side of said plate, and means for preventing rotation of the plate relative to the wheel.

2. The combination with an axle, and a car wheel mounted thereon, of anti-friction bearings interposed between the wheel and the axle, the wheel being provided in its outer face at intervals with slots having enlarged entrance openings at one end, a cover plate having tenons engageable through said openings to seat in said slots, and a nut mounted tightly upon the axle at the outer side of said plate and engaging the plate and having a central portion extending through a central opening in the plate to abut the outer anti-friction bearings.

3. The combination with an axle, and a car wheel mounted thereon, of anti-friction bearings interposed between the wheel and the axle, the wheel having dovetail slots in its outer face with enlarged openings at ends of the slots, a cover plate fitted to the outer face of the car wheel and provided with dovetail tenons engageable through said openings and in said slots, the car wheel and said plate having registering radial groves at the periphery of the plate, a locking key engaged in said grooves, and a smooth-bored nut fitted tightly upon the axle and having a central portion engaging through the central opening of the plate and provided marginally on its inner face with an annular rib seated in an annular groove in the outer face of said plate.

In testimony whereof I affix my signature.

ANDREW L. CARROLL.